US012430476B2

(12) United States Patent
Grobelny et al.

(10) Patent No.: US 12,430,476 B2
(45) Date of Patent: Sep. 30, 2025

(54) PREVENTING CONTENT RENDERED BY A DISPLAY FROM BEING CAPTURED OR RECORDED

(71) Applicant: Dell Products, L.P., Round Rock, TX (US)

(72) Inventors: Nicholas D. Grobelny, Evergreen, CO (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 238 days.

(21) Appl. No.: 17/812,373

(22) Filed: Jul. 13, 2022

(65) Prior Publication Data

US 2024/0020427 A1    Jan. 18, 2024

(51) Int. Cl.
*G06F 21/84* (2013.01)
*G06F 21/62* (2013.01)
*G06V 10/20* (2022.01)

(52) U.S. Cl.
CPC .......... *G06F 21/84* (2013.01); *G06F 21/6245* (2013.01); *G06V 10/255* (2022.01)

(58) Field of Classification Search
CPC ............................ G06F 21/84; G06F 21/6245
See application file for complete search history.

(56) References Cited

U.S. PATENT DOCUMENTS

| | | | | |
|---|---|---|---|---|
| 9,208,753 B2* | 12/2015 | Chan | ............ | G06V 40/161 |
| 9,445,154 B2* | 9/2016 | Baker | ............ | H04N 5/2621 |
| 10,504,289 B2* | 12/2019 | Yildiz | ............ | H04N 13/239 |
| 11,409,917 B2* | 8/2022 | Robinson | ............ | G09G 3/2092 |
| 11,550,954 B1* | 1/2023 | Jonak | ............ | G06F 21/78 |
| 11,916,965 B2* | 2/2024 | Hamlin | ............ | G06F 21/33 |
| 11,972,014 B2* | 4/2024 | Murphy | ............ | H04L 51/18 |
| 2014/0078164 A1* | 3/2014 | Chan | ............ | H04N 7/18 345/589 |
| 2015/0371613 A1* | 12/2015 | Patel | ............ | G09G 5/395 345/549 |
| 2017/0104766 A1* | 4/2017 | Bhardwaj | ............ | G06F 21/00 |
| 2022/0067219 A1* | 3/2022 | Robinson | ............ | G06F 21/84 |
| 2022/0083948 A1* | 3/2022 | Robertson | ............ | G06Q 10/0635 |
| 2022/0360850 A1* | 11/2022 | Stanley | ............ | H04N 21/44218 |
| 2023/0214481 A1* | 7/2023 | Singh | ............ | G06F 21/44 726/26 |
| 2023/0267637 A1* | 8/2023 | Tan | ............ | G06V 10/764 382/103 |
| 2023/0281285 A1* | 9/2023 | Atkinson | ............ | G06F 21/32 726/28 |
| 2023/0353610 A1* | 11/2023 | Iyer | ............ | H04L 65/401 |
| 2023/0409721 A1* | 12/2023 | Ghosh | ............ | G06F 21/84 |

* cited by examiner

*Primary Examiner* — Viral S Lakhia

(74) *Attorney, Agent, or Firm* — Fogarty LLP

(57) ABSTRACT

Systems and methods for preventing content rendered by an Information Handling System (IHS) display from being captured or recorded (e.g., photographed, filmed, recorded, etc.) are described. In an embodiment, an IHS may include a processor and a memory coupled to the processor, the memory having program instructions stored thereon that, upon execution, cause the IHS to: receive an image from a camera; detect a device in the image; and in response to the detection, prevent content rendered by a display from being captured or recorded by the device.

14 Claims, 3 Drawing Sheets

PREVENTING CONTENT RENDERED BY A DISPLAY FROM BEING CAPTURED OR RECORDED

FIELD

This disclosure relates generally to Information Handling Systems (IHSs), and, more specifically, to systems and methods for preventing content rendered by an IHS display from being captured or recorded (e.g., photographed, filmed, recorded, etc.).

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for preventing content rendered by an Information Handling System (IHS) display from being captured or recorded (e.g., photographed, filmed, recorded, etc.) are described. In an illustrative, non-limiting embodiment, an IHS may include a processor and a memory coupled to the processor, the memory having program instructions stored thereon that, upon execution, cause the IHS to: receive an image from a camera; detect a device in the image; and in response to the detection, prevent content rendered by a display from being captured or recorded by the device.

In some cases, the camera may be mounted on, or integrated into, the display, and the camera and the display may be coupled to the IHS. The image may include an image of the user of the IHS. And the device may include at least one of: a phone, a tablet, a laptop, or another camera.

To detect the device in the image, the program instructions, upon execution, may cause the IHS to provide the image to an inference engine configured to identify a shape of the device in the image. Additionally, or alternatively, to detect the device in the image, the program instructions, upon execution, cause the IHS to provide the image to an inference engine configured to identify a snapshot or aiming motion of the device. Additionally, or alternatively, to detect the device in the image, the program instructions, upon execution, cause the IHS to provide the image to an inference engine configured to identify a flash emitted by the device.

The program instructions, upon execution, may cause the IHS to determine that more than one person is in front of the display, and the protection of the content may be, at least in part, in response to the determination. Additionally, or alternatively, the program instructions, upon execution, cause the IHS to determine that the IHS is in a selected location, where the protection of the content is, at least in part, in response to the determination. Additionally, or alternatively, the program instructions, upon execution, cause the IHS to determine that the content comprises data subject to confidentiality or secrecy, where the protection of the content is, at least in part, in response to the determination. Additionally, or alternatively, the program instructions, upon execution, cause the IHS to determine that a user of the IHS is a protected user, where the protection of the content is, at least in part, in response to the determination. Additionally, or alternatively, the program instructions, upon execution, cause the IHS to determine that a selected application or type of application is in execution, where the protection of the content is, at least in part, in response to the determination.

The application or type of application may be selected from the group consisting of: a remote collaboration application, a video-conferencing application, an e-mail client, a messaging client, and a productivity application. To prevent the content from being captured or recorded by the device, the program instructions, upon execution, cause the IHS to dim, power down, or power off the display.

Additionally, or alternatively, to prevent the content from being captured or recorded by the device, the program instructions, upon execution, cause the IHS to apply a setting, visual effect, color, or overlay to at least a portion of the display where the content is rendered. Additionally, or alternatively, to prevent the content from being captured or recorded by the device, the program instructions, upon execution, cause the IHS to close or minimize a window or an application that renders the content. Additionally, or alternatively, to prevent the content from being captured or recorded by the device, the program instructions, upon execution, cause the IHS to notify a user or administrator of the IHS. Additionally, or alternatively, to prevent the content from being captured or recorded by the device, the program instructions, upon execution, cause the IHS to use the camera to take a picture representative of an environment in front of the display.

In another illustrative, non-limiting embodiment, a method may include detecting a device in an image obtained by a camera, where the camera is mounted on, or integrated into, a display configured to render content; and in response to the detection, protecting the content from being captured or recorded by the device.

In yet another illustrative, non-limiting embodiment, a memory storage device may have program instructions stored thereon that, upon execution by an IHS, cause the IHS to: detect a device in an image obtained by a camera, where the image is representative of an environment in front of a display configured to render content; and in response to the detection, resist capture or recording of the content by the device.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Figure 1:
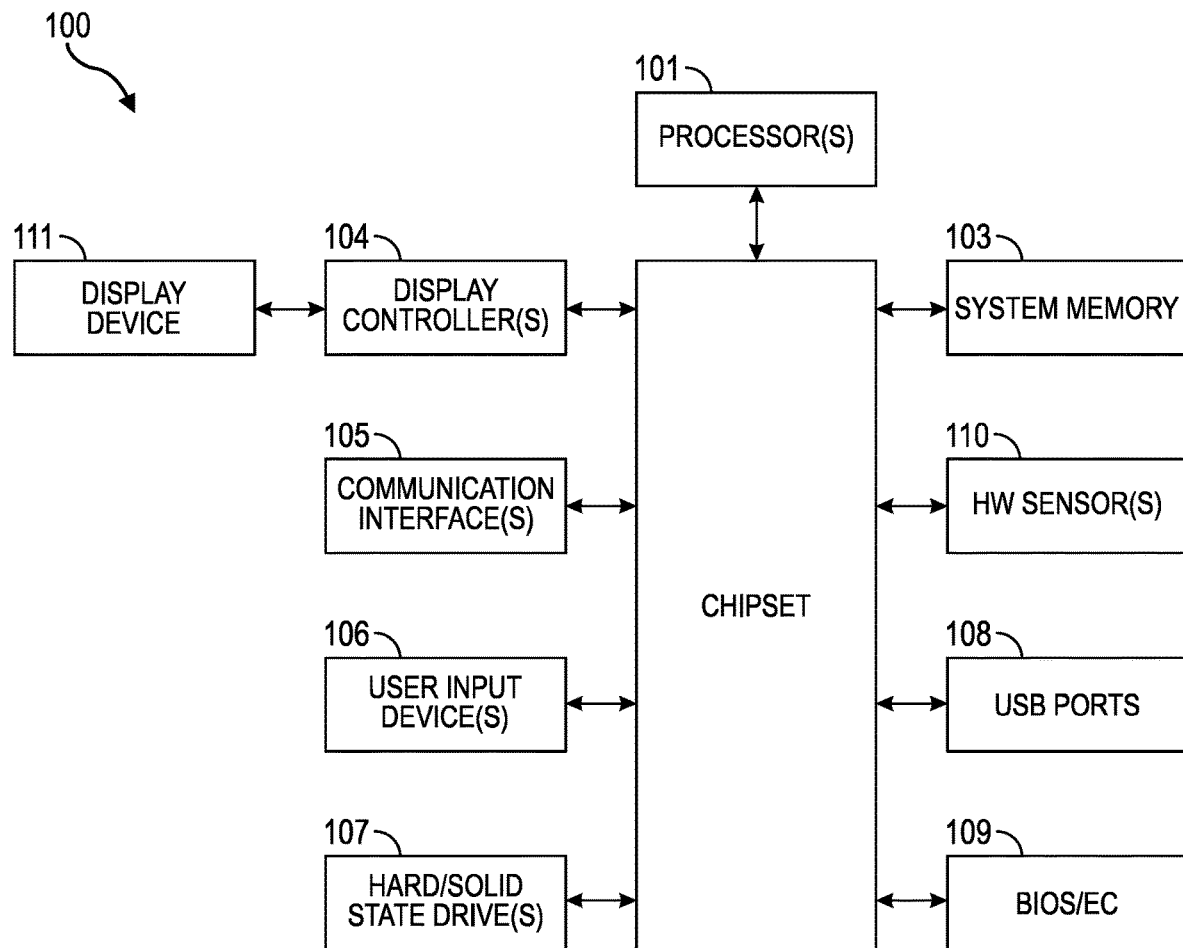
FIG. 1 depicts a block diagram of examples of components of an Information Handling System (IHS), according to some embodiments.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include random access memory (RAM), one or more processing resources such as a central processing unit (CPU) or hardware or software control logic, ROM, and/or other types of nonvolatile memory. Additional components of an IHS may include one or more disk drives, one or more network ports for communicating with external devices as well as various input and output (I/O) devices, such as a keyboard, a mouse, touchscreen and/or a video display. An IHS may also include one or more buses operable to transmit communications between the various hardware components. A more detailed example of an IHS is described with respect to FIG. 1. It should be appreciated that although certain embodiments are discussed in the context of a personal computing device, other embodiments may utilize other types of IHSs.

In the world of IHS security, data privacy and protection are significant areas of concern. Today there is a plethora of technologies that offer protection for data, at rest and in use, to prevent its unauthorized copying or exfiltration. For example, media companies and movie studios can deploy technologies designed to protect copyrighted content under development (also during user consumption). Organizations responsible for protecting trade secrets, confidential communications, or privileged information may use encryption to protect data in memory, files, or streams while stored, used, or sent across networks.

Once a data file is accessed and opened, however, its contents invariably end up rendered by an IHS's display. Regardless of how the data file is protected digitally, while stored, transmitted, or in use, the underlying data is nonetheless subject to being captured or recorded as raw optical output when rendered by the display. Information rendered by a display can be photographed, filmed, or otherwise recorded by another device (e.g., a camera, a smartphone, etc.) that is typically not protected by the same security domain as the IHS storing the information.

As a hypothetical example, consider a user who is authorized by an organization to view sensitive information, but not allowed to copy it. In some situations, the user may attempt to capture and store the data on unauthorized devices, such as a personal smartphone (e.g., to review later). Regardless of whether the user has harmless intent, their unauthorized capture or recording of data may expose sensitive information to unprotected storage (e.g., photo sharing apps, social media, non-password-protected phone storage, text messages, etc.) which can then be exfiltrated by malicious actors without the user's or the organization's knowledge or consent.

As another example, an insider threat for an organization (e.g., a vindictive employee, an employee extorted or socially engineered by a malicious outsider, etc.) may be able to exfiltrate the sensitive information in ways that cause harm to the organization (e.g., ransom, insider trading, intellectual property theft, etc.). As still another example, a malicious "shoulder surfer" may take a photo or video of sensitive information displayed on an authorized user's display in a public setting (e.g., coffee shop, airplane, etc.). As yet another example, a first user may inadvertently access sensitive content in an environment where a second user (e.g., standing behind the first user) is attending a video conference, thus allowing viewers of the second user's conference to see the sensitive information on the first user's display.

In most of these examples, there is no easy way to protect or control information after it has been photographed, filmed, or recorded.

To address these, and other concerns, systems and methods described herein may prevent content rendered by an IHS display from being captured or recorded (e.g., photographed, filmed, etc.). These systems and methods may provide a service set executing in an IHS that utilizes its webcam pipeline to infer the detection of a suspicious device using a Machine Learning (ML) or Artificial Intelligence (AI) model and executes responsive or remediation activities (e.g., disabling the display, enabling privacy screen technologies, closing application windows, capturing a photograph of the user, silently logging and alerting remote administrators, etc.).

FIG. 1 is a block diagram of components of IHS 100, according to some embodiments. As depicted, IHS 100 includes processor 101. In various embodiments, IHS 100 may be a single-processor system, or a multi-processor system including two or more processors. Processor 101 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 102 coupled to processor 101. Chipset 102 may provide processor 101 with access to several resources. In some cases, chipset 102 may utilize a QuickPath Interconnect (QPI) bus to communicate with processor 101. Chipset 102 may also be coupled to communication interface(s) 105 to enable communications between IHS 100 and various wired and/or wireless networks, such as Ethernet, WiFi, BT, cellular or mobile networks (e.g., code-division multiple access or "CDMA," time-division multiple access or "TDMA," Long-Term Evolution or "LTE," etc.), satellite networks, or the like. In some cases, communication interface(s) 105 may be used to communicate with devices (e.g., BT speakers, microphones, headsets, etc.). Moreover, communication interface(s) 105 may be coupled to chipset 102 via a PCIe bus.

Chipset 102 may be coupled to display controller(s) 104, which may include one or more or graphics processor(s) (GPUs) on a graphics bus, such as an Accelerated Graphics Port (AGP) or Peripheral Component Interconnect Express (PCIe) bus. As shown, display controller(s) 104 provide video or display signals to display device 111. In other implementations, any number of display controllers or display devices may be used.

Display device 111 may include Liquid Crystal Display (LCD), Light Emitting Diode (LED), organic LED (OLED), or other thin film display technologies. Display device 111 may include a plurality of pixels arranged in a matrix, configured to display visual information, such as text, two-dimensional images, video, three-dimensional images, etc. In some cases, display device 111 may be provided as a single continuous display, rather than two discrete displays.

Chipset 102 may provide processor 101 and/or display controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like. Memory 103 may store program instructions that, upon execution by processor 101, enable a collaboration mode for a touchpad coupled or integrated into IHS 100.

Chipset 102 may also provide access to one or more hard disk and/or solid-state drives 107. In certain embodiments, chipset 102 may also provide access to one or more optical drives or other removable-media drives. In certain embodiments, chipset 102 may also provide access to one or more Universal Serial Bus (USB) ports 108, to which one or more peripheral devices may be coupled (e.g., internal or external webcams, microphones, speakers, etc.).

Chipset 102 may further provide access to one or more user input devices 106, for example, using a super I/O controller or the like. Examples of user input devices 106 include, but are not limited to, a keyboard, mouse, touchpad, stylus or active pen, totem, etc. Each of user input devices 106 may include a respective controller (e.g., a touchpad may have its own touchpad controller) that interfaces with chipset 102 through a wired or wireless connection (e.g., via communication interfaces(s) 105).

In certain embodiments, chipset 102 may also provide an interface for communications with one or more hardware (HW) sensors 110. Sensors 110 may be disposed on or within the chassis of IHS 100, or otherwise coupled to IHS 100, and may include, but are not limited to: electric, magnetic, radio, optical (e.g., camera, webcam, etc.), infrared, thermal, force, pressure, acoustic, ultrasonic, proximity, position, deformation, bending, direction, movement, velocity, rotation, and/or acceleration sensor(s).

Upon booting of IHS 100, processor(s) 101 may utilize Basic Input/Output System (BIOS) instructions of BIOS/Embedded Controller (EC) 109 to initialize and test hardware components coupled to IHS 100 and to load an OS for use by IHS 100. BIOS 109 provides an abstraction layer that allows the OS to interface with certain hardware components that are utilized by IHS 100. Via the hardware abstraction layer provided by BIOS 109, software stored in system memory 103 and executed by processor 101 can interface with certain I/O devices that are coupled to IHS 100. The Unified Extensible Firmware Interface (UEFI) was designed as a successor to BIOS. As a result, many modern IHSs utilize UEFI in addition to or instead of a BIOS. As used herein, BIOS 109 is intended to also encompass a UEFI component.

EC 109 may be installed as a Trusted Execution Environment (TEE) component to the motherboard of IHS 100. EC 109 may implement operations for interfacing with a power adapter in managing power for IHS 100. Such operations may be utilized to determine the power status of IHS 100, such as whether IHS 100 is operating from battery power or is plugged into an AC power source. Firmware instructions utilized by EC 109 may be used to provide various core operations of IHS 100, such as power management and management of certain modes of IHS 100 (e.g., turbo modes, maximum operating clock frequencies of certain components, etc.).

In some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

EC 109 may also implement operations for detecting certain changes to the physical configuration or posture of IHS 100 and managing the modes of a touchpad or other user input device 106 in different configurations of IHS 100. For instance, where IHS 100 as a 2-in-1 laptop/tablet form factor, EC 109 may receive inputs from a lid position or hinge angle sensor 110, and it may use those inputs to determine: whether the two sides of IHS 100 have been latched together to a closed position or a tablet position, the magnitude of a hinge or lid angle, etc.

EC 109 may be further configured to calculate hashes or signatures that uniquely identify individual components of IHS 100. In such scenarios, EC 109 may calculate a hash value based on the configuration of a hardware and/or software component coupled to IHS 100. For instance, EC 109 may calculate a hash value based on all firmware and other code or settings stored in an onboard memory of a hardware component. Such hash values may be calculated as part of a trusted process of manufacturing IHS 100 and may be maintained in secure storage as a reference signature. EC 109 may later recalculate the hash value for a component may compare it against the reference hash value to determine if any modifications have been made to the component, thus indicating that the component has been compromised. In this manner, EC 109 may validate the integrity of hardware and software components installed on IHS 100.

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be executed by components integrated into processor(s) 101 as systems-on-a-chip (SoC). As such, in various embodiments, IHS 100 may be implemented as different classes of computing devices including, but not limited to: servers, workstations, desktops, laptops, appliances, video game consoles, tablets, smartphones, etc.

Figure 2:
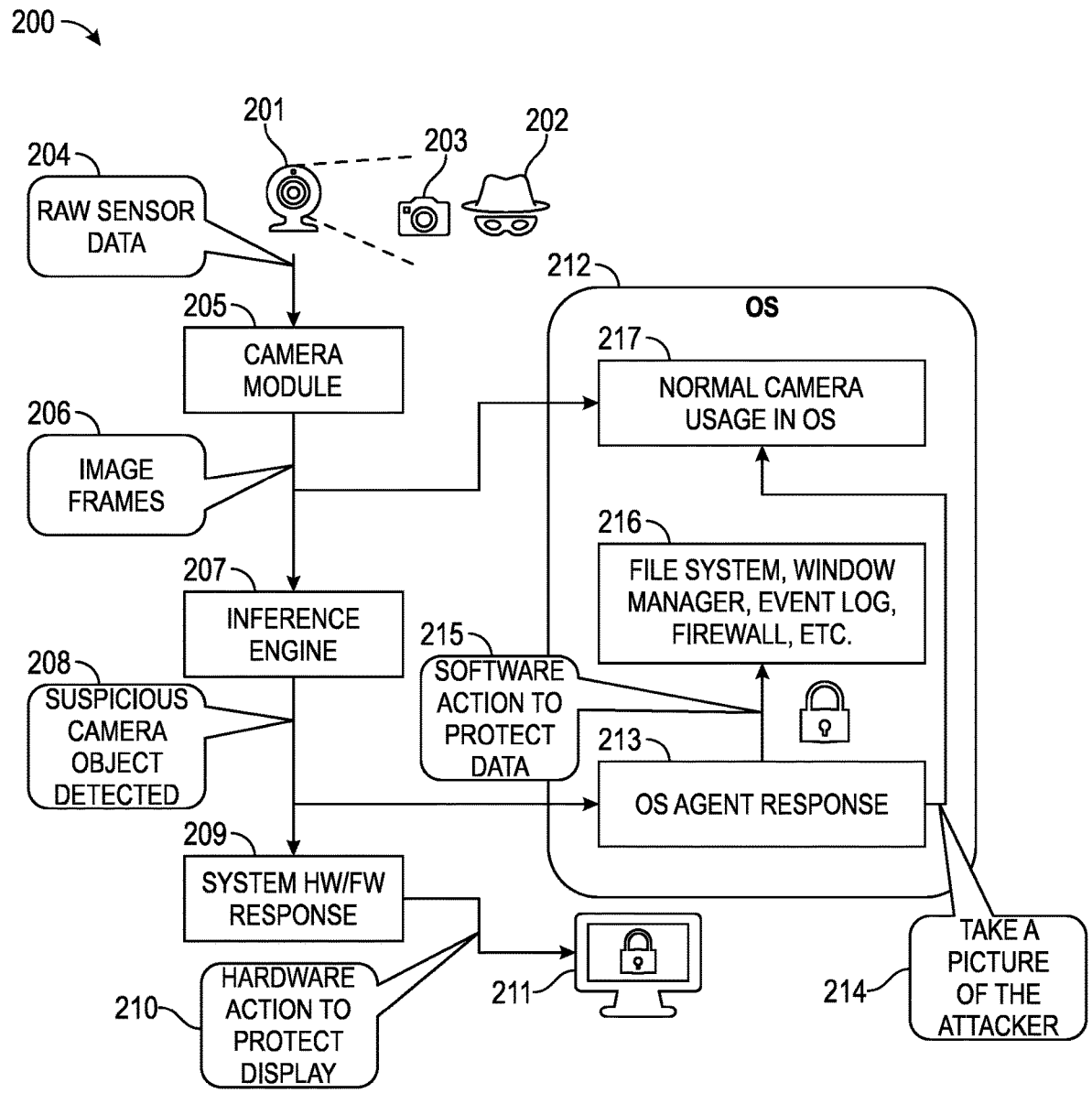
FIG. 2 depicts a block diagram of an example of a system for preventing content rendered by an IHS display from being captured or recorded, according to some embodiments.

FIG. 2 depicts a block diagram of an example of system 200 for preventing content rendered on a display from being captured or recorded (e.g., photographed, filmed, recorded, etc.). In some embodiments, components of system 200 may be instantiated, at least in part, through the execution of program instructions stored in a memory device (e.g., system memory 103) by a processor (e.g., processor(s) 101) of one or more IHSs (e.g., IHS 100).

Particularly, as shown in FIG. 2, camera 201 is mounted or integrated into display 111 of IHS 100. In some cases, however, camera 201 may be coupled to IHS wirelessly (e.g., BLUETOOTH or "BT") or via a wire (e.g., USB).

Moreover, camera 201 may be configured to obtain an image representative of a physical environment in front of display 111.

Meanwhile, the physical environment in front of display 111 may contain device 203 (e.g., a smartphone, tablet, camera, camcorder, etc.) capable of capturing or recording data rendered on display 111. In some cases, device 203 may be operated by a legitimate user of IHS. In other cases, device 203 may be operated by unauthorized user 202. In yet other cases, device 203 may left in front of display 111 and operated remotely (or retrieved at a later time).

Camera module 205 may be configured to receive raw sensor data 204 from camera 201 and produce one or more image frames 206 based on raw sensor data 204. Inference engine 207 is coupled to camera module 205 and it may include ML/AI models configured to detect, recognize, or identify, in image frames 206, at least one of: a shape of device 203, a position or angle of device 203 (e.g., relative to display 111), a lens of device 203, a flash emitted by device 203, a motion of device 203 (e.g., a snapshot motion), a user of device 203, a user of IHS 100, a stance of a user of device 203 and/or IHS 100, a number of persons in front of display 111, etc.

In various embodiments, in order to perform the aforementioned detection operations, inference engine 207 may be configured to execute ML/AI models or workloads including, but not limited to: regression workloads (e.g., Ordinary Least Squares Regression (OLSR), Linear Regression, Logistic Regression, Stepwise Regression, Multivariate Adaptive Regression Splines (MARS), Locally Estimated Scatterplot Smoothing (LOESS), etc.), instance-based workloads (e.g., k-Nearest Neighbor (kNN), Learning Vector Quantization (LVQ), Self-Organizing Map (SOM), Locally Weighted Learning (LWL), Support Vector Machines (SVM), etc.), regularization workloads (e.g., Ridge Regression, Least Absolute Shrinkage and Selection Operator (LASSO), Elastic Net, Least-Angle Regression (LARS), etc.), decision tree workloads (e.g., Classification and Regression Tree (CART), Iterative Dichotomizer 3 (I03), C4.5 and C5.0, Chi-squared Automatic Interaction Detection (CHAID), Decision Stump, M5, Conditional Decision Trees, etc.), Bayesian workloads (e.g., Naive Bayes, Gaussian Naive Bayes, Multinomial Naive Bayes, Averaged One-Dependence Estimators (AODE), Bayesian Belief Network (BBN), Bayesian Network (BN), etc.), clustering workloads (e.g., k-Means, k-Medians, Expectation Maximization (EM), Hierarchical Clustering, Association Rule Learning Algorithms, etc.), association rule learning workloads (e.g., Apriori algorithm, Eclat algorithm, etc.), artificial neural network workloads (e.g., Perceptron, Multilayer Perceptrons (MLP), Back-Propagation, Stochastic Gradient Descent, Hopfield Network Radial Basis Function Network (RBFN), etc.), deep learning workloads (e.g., Convolutional Neural Network (CNN), Recurrent Neural Networks (RNNs), Long Short-Term Memory Networks (LSTMs), Stacked Auto-Encoders, Deep Boltzmann Machine (DBM), Deep Belief Networks (DBN), etc.), dimensionality reduction workloads (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA), etc.), ensemble workloads (e.g., Boosting, Bootstrapped Aggregation (Bagging), AdaBoost, Weighted Average (Blending), Stacked Generalization (Stacking), Gradient Boosting Machines (GBM), Gradient Boosted Regression Trees (GBRT), Random Forest, etc.), etc.

IHS hardware/firmware response module 209 is coupled to inference engine 207. In response to inference engine 207 detecting device 203 (e.g., at a particular angle, by its motion, flash, lens, etc.), IHS hardware/firmware response module 209 may take one or more hardware actions 210 to protect display 111 at 211. Examples of hardware actions 210 by IHS hardware/firmware response module 209 may include, but are not limited to: (a) dimming, powering down, or powering off display 111, or (b) applying a setting, visual effect, color, texture, or overlay to at least a portion of the display where the content is rendered.

OS agent response module 213 of OS 212 executed by IHS 100 is also coupled to inference agent 207. In response to inference engine 207 detecting device 203 (e.g., at a particular angle, by its motion, flash, lens, etc.), IHS hardware/firmware response module 209 may take one or more software actions 215 to protect display 111.

For example, file system, window manager, event log, firewall components 216 of OS 212 may: close or minimize a window or an application that renders the content, notify a user or administrator of the IHS of the event (and/or log the event), block access to a data file corresponding to the content, change access permissions or settings of the data file, content and/or IHS 100, or the like.

OS agent response module 213 may also use camera 201 to take a picture representative of the physical environment in front of display 111, including the user of IHS 100 and/or attacker 202. At block 217, OS 212 may resume normal use of camera 201.

In various implementations, components of system 200 may be implemented as one or more software services executed by IHS 100. Firmware service "A" (e.g., associated with block 205) may run on low power vision firmware and/or CPU 101 to obtain camera image streams and execute image identification and classification model(s) to determine if device 203 is detected. Firmware service "B" (e.g., associated with block 207) may run on a host sensor hub/IC responsible for collecting classification data from service "A" and delivering that data to OS service "C" (e.g., associated with block 213), for example, based upon a policy configuration.

OS service "C" may configure firmware services "A" and "B," collect inference state determination from firmware service "A" via firmware service "C," and distribute to requested OS service "D." Additionally, OS service "C" may perform system context detection to dynamically or statically firmware services "A" and "B" for communication delivery. In some cases, OS service "C" may be executed, at least in part, by EC 109 for detection and evaluation without an OS agent.

OS service "D" (e.g., associated with block 216) may perform IHS operations to react to inference of attack or vulnerability, such as entering into a low power state, blanking or blurring display 111, notifying user and/or ITDM, etc. OS service "E" (e.g., associated with block 212) may interface with remote or cloud services to configure a management policy to be used across firmware services "A" and "B" and OS service "C" and "D." OS service "F" (e.g., also associated with block 212) may advertise application security requirements to allow for OS service "C" to modify system state actions and return in dynamic form.

Figure 3:
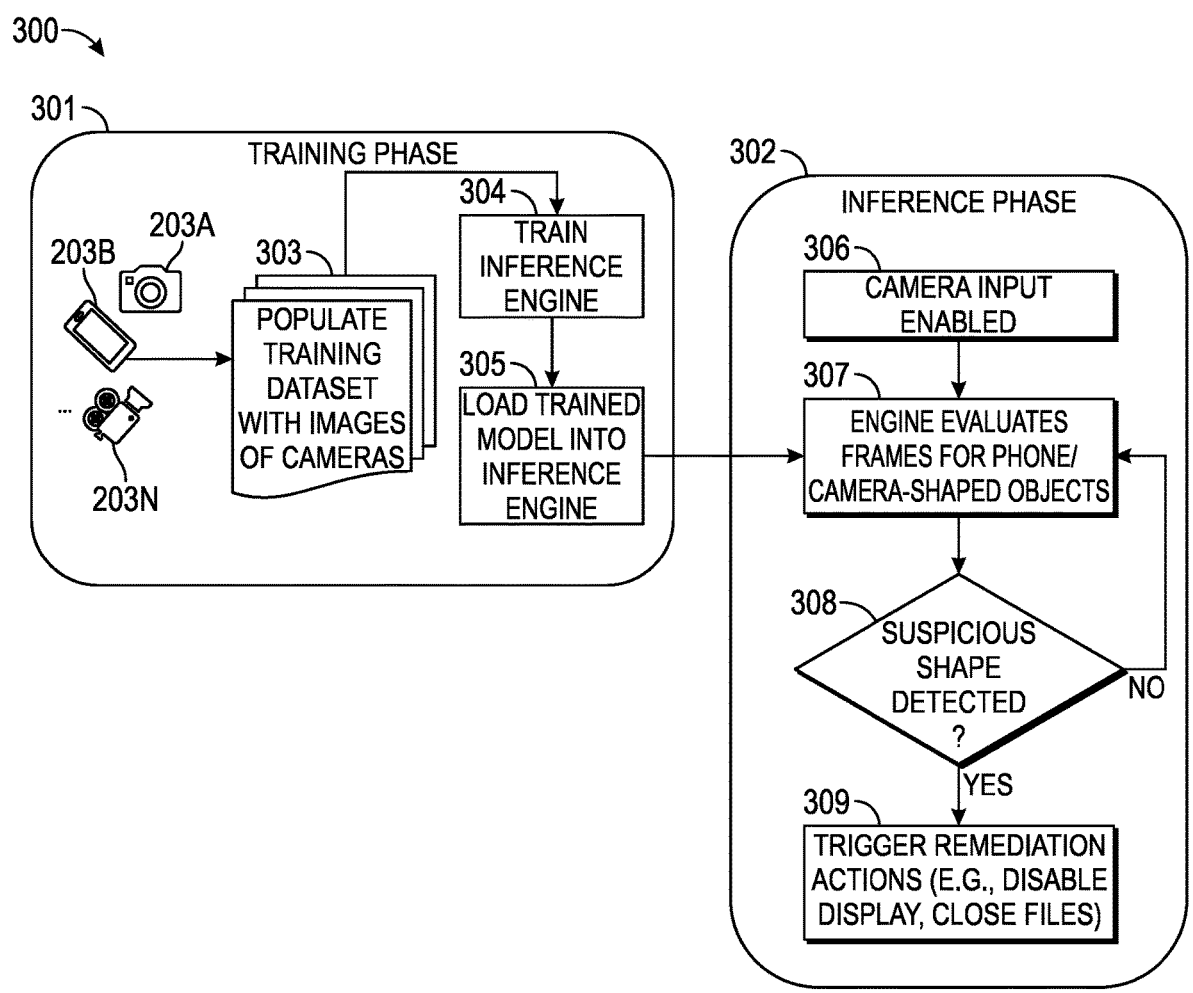
FIG. 3 depicts a flowchart of an example of a method for preventing content rendered by an IHS display from being captured or recorded, according to some embodiments.

FIG. 3 depicts a flowchart of an example of method 300 for preventing content rendered on a display from being captured or recorded (e.g., photographed, filmed, recorded, etc.). In some embodiments, one or more operations of method 300 may be performed, at least in part, by one or more components of system 200 shown in FIG. 2. Particularly, method 300 includes training phase 301 followed by inference phase 302.

During training phase 301, at 303, method 300 includes populating an ML/AI training dataset with images of devices 203A-N. Additionally, or alternatively, 303 may include populating an ML/AI training dataset with images of devices 203A-N with their respective camera lenses pointed at the device capturing those images. For example, in a case where device 203 is a phone, the phone may have its own screen parallel, or approximately parallel (e.g., within 1, 5, 10, or 25 degrees) with respect to the surface of display 111.

Additionally, or alternatively, 303 may include populating an ML/AI training dataset with images or data representative of the physical motion(s) of devices 203A-N when a person (e.g., 202) takes a picture or records a video with devices 203A-N (e.g., a "snapshot" or "aiming" motion). Additionally, or alternatively, 303 may include populating an ML/AI training dataset with images or data representative of a flash emitted by devices 203A-N (e.g., a guiding flash usable by device 203 to adjust its settings before capturing or recording an image).

At 305, method 300 may use the training dataset of block 304 to train an ML/AI inference engine. Then, at 306, method 300 loads the trained model into the inference engine before inference phase 302 starts.

In some cases, inference phase 302 may start in response to a determination that more than one person is in front of display 111 (e.g., using sensors 110). Additionally, or alternatively, inference phase 302 may start in response to a determination that IHS 100 is in a selected location. Additionally, or alternatively, inference phase 302 may start in response to a determination that the content rendered by display 111 comprises data subject to confidentiality or secrecy. Additionally, or alternatively, inference phase 302 may start in response to a determination that a user of IHS 100 is a high-security or special clearance user among a plurality of ordinary or low-security or ordinary users. Additionally, or alternatively, inference phase 302 may start in response to a determination that a selected application or type of application (e.g., a remote collaboration application, a video-conferencing application, an e-mail client, a messaging client, or a productivity application) is in being executed by IHS 100 (e.g., in the foreground, in the background, etc.).

At 307, method 300 enables the input of camera 201. At 308, inference engine 207 evaluates image frames for phone/camera-shaped objects or other potential recording devices 203A-N. Additionally, or alternatively, inference engine 207 evaluates image frames for physical motion(s) of devices 203A-N. Additionally, or alternatively, inference engine 207 evaluates image frames for images representative of a flash emitted by devices 203A-N.

Still at 308, method 300 determines, based upon its evaluation of the image frames whether a suspicious object, shape, motion, or triggering other conditions (e.g., motion, flashes, etc.) have been detected. If not, control returns to block 308. Otherwise, at 310, method 300 initiates one or more responsive or remediation actions described above.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, IoT devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
   a processor; and
   a memory coupled to the processor, the memory having program instructions stored thereon that, upon execution, cause the IHS to:
   receive an image from a camera;
   detect, based upon the image, at least one of: a snapshot or aiming motion of a device, or a flash emitted by the device;
   determine that content rendered by a display comprises data subject to confidentiality or secrecy;
   determine that a user of the IHS is a protected user;
   determine that a selected application or type of application is used to render the content; and
   in response to the detection, prevent the content from being captured or recorded by the device by dimming the display, powering down the display, powering off the display, applying a setting, visual effect, color, or overlay to at least a portion of the display where the content is rendered, or closing or minimizing a window or the application that renders the content;
   wherein the prevention of the content from being captured or recorded is, at least in part, in response to the determination steps.

2. The IHS of claim 1, wherein the camera is mounted on, or integrated into, the display, and wherein the camera and the display are coupled to the IHS.

3. The IHS of claim 1, wherein the image comprises an image of the user of the IHS.

4. The IHS of claim 1, wherein the device comprises at least one of: a phone, a tablet, a laptop, or another camera.

5. The IHS of claim 1, wherein to perform the detection step, the program instructions, upon execution, further cause the IHS to provide the image to an inference engine configured to identify a shape of the device in the image.

6. The IHS of claim 1, wherein to perform the detection step, the program instructions, upon execution, further cause the IHS to provide the image to an inference engine configured to identify the snapshot or aiming motion of the device.

7. The IHS of claim 1, wherein to perform the detection step, the program instructions, upon execution, further cause the IHS to provide the image to an inference engine configured to identify the flash emitted by the device.

8. The IHS of claim 1, wherein the program instructions, upon execution, further cause the IHS to determine that more than one person is in front of the display, and wherein the prevention of the content from being captured or recorded is, at least in part, in response to the determination that more than one person is in front of the display.

9. The IHS of claim 1, wherein the program instructions, upon execution, further cause the IHS to determine that the IHS is in a selected location, and wherein the prevention of the content from being captured or recorded is, at least in part, in response to the determination that the IHS is in the selected location.

10. The IHS of claim 1, wherein the application or type of application is selected from the group consisting of: a remote collaboration application, a video-conferencing application, an e-mail client, a messaging client, and a productivity application.

11. The IHS of claim 1, wherein to prevent the content from being captured or recorded by the device, the program instructions, upon execution, further cause the IHS to notify the user or an administrator of the IHS.

12. The IHS of claim 1, wherein to prevent the content from being captured or recorded by the device, the program instructions, upon execution, further cause the IHS to use the camera to take a picture representative of an environment in front of the display.

13. A method, comprising:
   detecting, based upon an image obtained by a camera, a motion of a device, wherein the camera is mounted on, or integrated into, a display configured to render content;
   determining that the content comprises data subject to confidentiality or secrecy;
   determining that a user of the display is a protected user;
   determining that a selected application or type of application is used to render the content; and
   in response to the detection, preventing the content from being captured or recorded by the device by dimming the display, powering down the display, powering off the display, applying a setting, visual effect, color, or overlay to at least a portion of the display where the content is rendered, or closing or minimizing a window or the application that renders the content;
   wherein the prevention of the content from being captured or recorded is, at least in part, in response to the determining steps.

14. A memory storage device having program instructions stored thereon that, upon execution by an Information Handling System (IHS), cause the IHS to:

detect, based upon an image obtained by a camera, a flash emitted by a device, wherein the image is representative of an environment in front of a display configured to render content;

determine that the content comprises data subject to confidentiality or secrecy;

determine that a user of the IHS is a protected user;

determine that a selected application or type of application is used to render the content; and in response to the detection, prevent capturing or recording of the content by the device by dimming the display, powering down the display, powering off the display, applying a setting, visual effect, color, or overlay to at least a portion of the display where the content is rendered, or closing or minimizing a window or the application that renders the content;

wherein the prevention of the capturing or recording of the content is, at least in part, in response to the determination steps.

* * * * *